Sept. 12, 1961  G. GARABELLO  2,999,613
REMOTE-CONTROLLED DEVICE FOR CLOSING AND OPENING
FUEL-TANKS OF MOTOR-VEHICLES
Filed Jan. 22, 1960
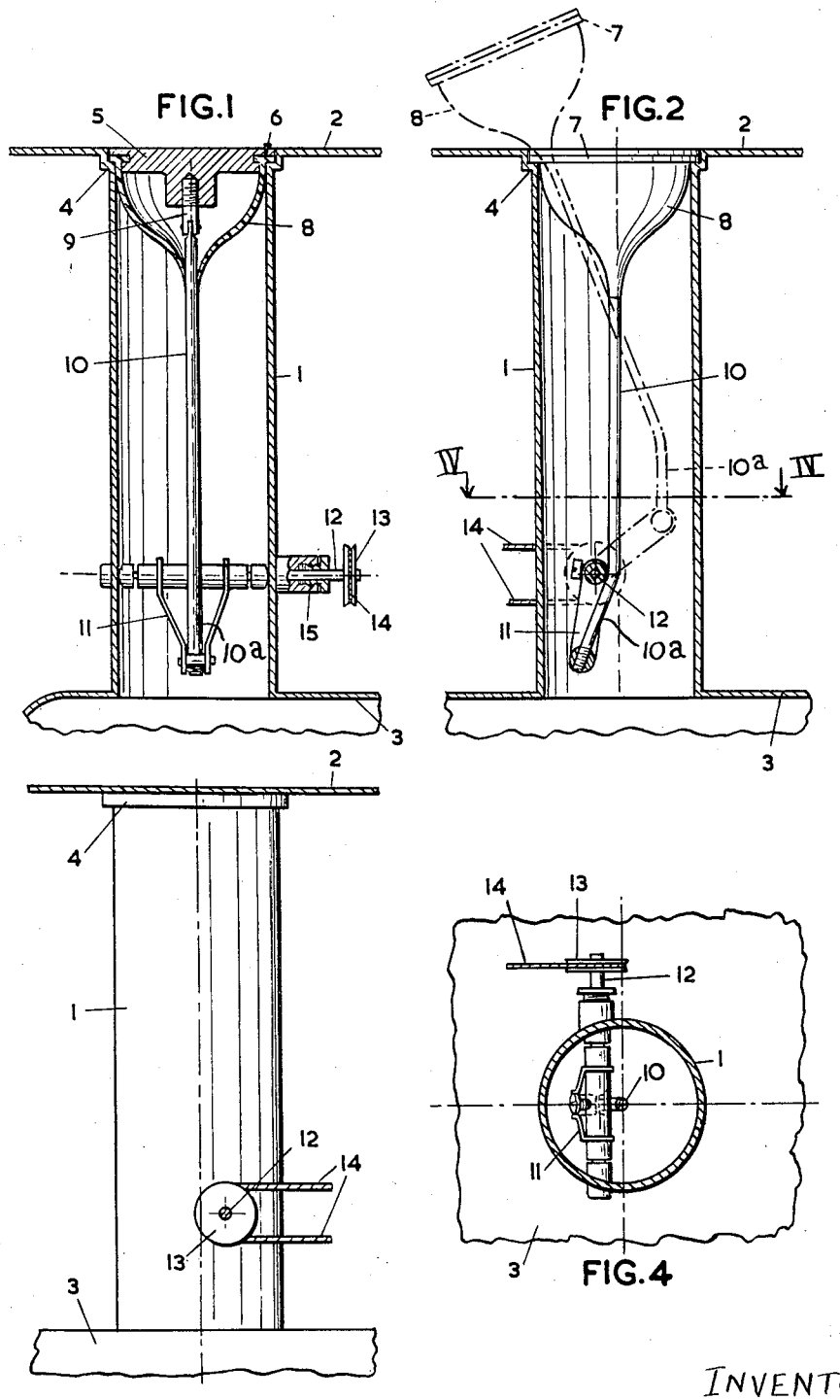
INVENTOR:
GIUSEPPE GARABELLO 2,999,613
REMOTE-CONTROLLED DEVICE FOR CLOSING AND OPENING FUEL-TANKS OF MOTOR-VEHICLES
Giuseppe Garabello, 21 Ivrea, Chivasso, Turin, Italy
Filed Jan. 22, 1960, Ser. No. 4,115
Claims priority, application Italy Nov. 13, 1959
1 Claim. (Cl. 220—86)

The object of the present invention is to provide a remote-controlled filler cap assembly for motor vehicle tanks.

According to the invention, such an assembly comprises a filler tube for connection at one open end to the tank, a stepped formation at the other open end of the tube defining an annular shoulder to serve as a valve seating, an operating shaft disposed within the tube for rotation about an axis transverse to the longitudinal axis of the tube and extending at one end externally of the tube, a crank mounted on said operating shaft and disposed within the tube, a connecting rod coupled at the other end to the free end of the crank, and a valve member including a rigid disc coupled to the other end of the connecting rod and having a radial recess at is periphery and a resilient cup-shaped element disposed coaxially about the connecting rod with a flange seated in the peripheral recess of the disc, whereby the flange is caused to abut and seal against the valve seat shoulder when the connecting rod is operated to draw the valve member into that open end of the tube.

The device to which the present invention relates enables the fuel-tank to be opened and closed by the driver without descending from the motor-vehicle itself.

Other features and advantages will emerge in the course of the following description, which, studied in conjunction with the accompanying drawing, provided by way of an example, without any limitative effect, will clearly show how the present invention can be carried out, the special features emerging both from the text and from the diagram naturally constituting an integral part of the invention.

FIG. 1 is an axial cross section of the device in the closed position.

FIG. 2 is a section perpendicular to that of FIG. 1, the valve in the open position being shown by means of lines consisting of dashes and dots.

FIG. 3 is an elevation.

FIG. 4 is a horizontal section taken at the line IV—IV of FIG. 2.

With reference to the drawing, and in accordance with one preferred constructional form of the invention, the device consists of a cylindrical filler tube 1 between the coachwork 2 of the motor-vehicle and the fuel tank 3. At the top of the tube 1, and thus on the side of the coachwork, there is an annular shoulder 4, forming a seating for a valve consisting of a metal disc 5, terminating level with the coachwork and having a peripheral circular channelling 6 of which the purpose is to accommodate the edge 7 of a bowl-shaped cup 8 of resilient material (for example, synthetic rubber impervious to attack from the fuel), in such a way as to ensure the hermetic closing of the valve. A bolt 9 is screwed to disc 5, and a connecting rod 10 affixed to the said bolt passes through the cup 8 and extends inside the tube 1, as far as a forked crank 11 to which it is bolted and which is affixed to an operating shaft 12 which passes through the tube 1 and which terminates at one end in a pulley 13 which can be operated by means of a metal cable 14 which extends to the dashboard or to some other point within reach of the driver's hand.

It is obvious that when the metal cable 14 is pulled, the pulley 13 and the shaft 12 being thus caused to turn by about a quarter of a revolution, then the crank 11, acting via the connecting-rod 10, will cause the valve 5 and its cup 8 to emerge to one side, and the latter, resting on the edge of the tube 1, will uncover the fuel-outlet, to enable the mouth of the fuel-distributor to be introduced.

The device described in the foregoing and forming the subject of the present invention can also constitute a safety-closure if, contrary to what has been described solely by way of an example, it is arranged so that when the valve is closed the crank 11 is enabled, by virtue of an angled portion 10a on the connecting rod, to pass beyond the lower dead centre, in cuch a way that it will be impossible to open the valve from the outside without using the pulley.

It is of advantage for the piece of tubing 1 to be affixed to the tank by means of an elastic joint, not shown in the diagram.

Needless to say, the device can be mounted vertically or at an angle, according to the types of motor-vehicle on the market, and the shaft 12 can be equipped with a suitable stuffing-box 15, in order to prevent any leakage of fuel through 12 during the operation of filling the tank, and the shape and arrangement of the aforesaid elements may likewise differ from those described and illustrated, for the sake of the various applications required in practice, without thereby departing from the scope of the invention.

I claim:

A remote-controlled filler cap assembly for motor-vehicle fuel tanks comprising a filler tube for connecting at one open end to the tank, a stepped formation at the other open end of the tube defining an annular shoulder to serve as a valve seating, an operating shaft disposed within the tube for rotation about an axis transverse to the longitudinal axis of the tube and extending at one end externally of the tube, a crank mounted on said operating shaft and disposed within the tube, a connecting rod coupled at one end to the free end of the crank, and a valve member including a rigid disc coupled to the other end of the connecting rod and having a radial recess at its periphery and a resilient cup-shaped element disposed coaxially about the connecting rod with a flange seated in the peripheral recess of the disc, whereby the flange is caused to abut and seal against the valve seat shoulder when the connecting rod is operated to draw the valve member into that open end of the tube.

References Cited in the file of this patent

UNITED STATES PATENTS

| 2,054,145 | Tandy | Sept. 15, 1936 |
| 2,151,249 | Vidmar | Mar. 21, 1939 |

FOREIGN PATENTS

| 606,242 | Great Britain | Aug. 10, 1948 |